Sept. 27, 1938.  J. S. SHARPE  2,131,677

REVERSING GEAR

Filed Feb. 20, 1937   2 Sheets-Sheet 1

Inventor:
John S. Sharpe
by his Attorneys.
Howson & Howson

Sept. 27, 1938.    J. S. SHARPE    2,131,677
REVERSING GEAR
Filed Feb. 20, 1937    2 Sheets-Sheet 2
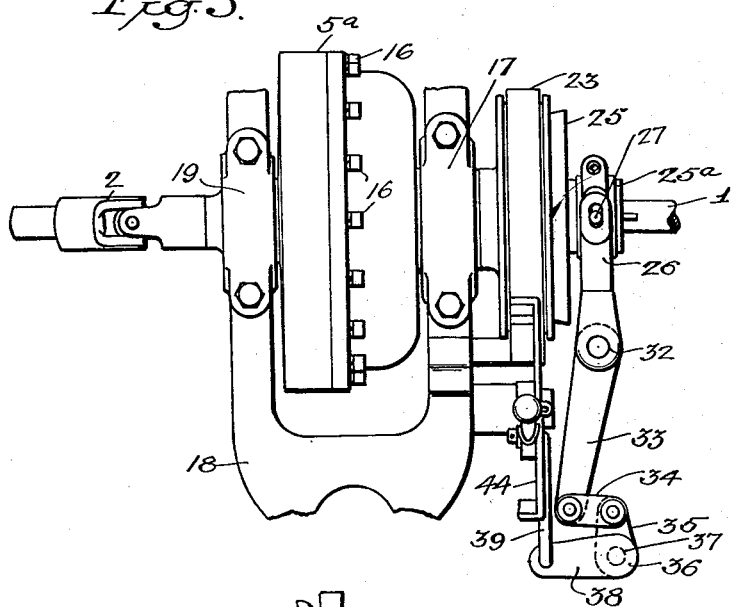
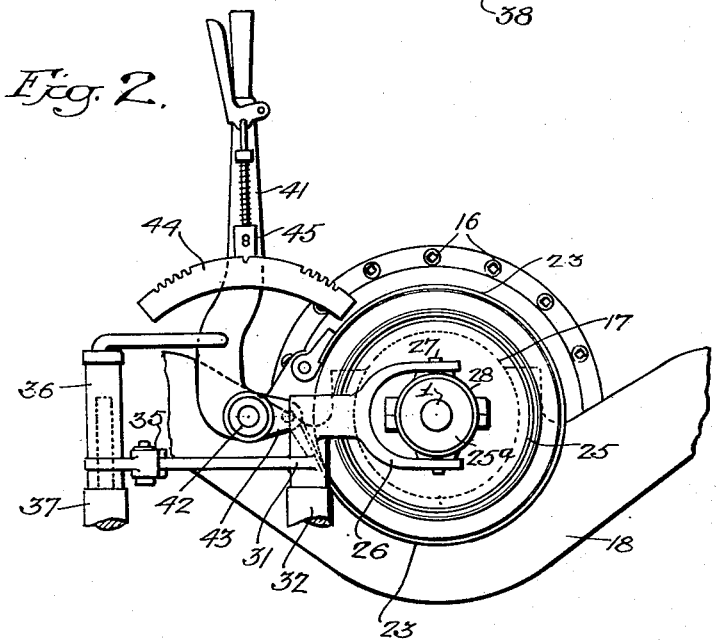
Inventor:
John S. Sharpe
by his Attorneys
Howson & Howson Patented Sept. 27, 1938

2,131,677

UNITED STATES PATENT OFFICE 2,131,677

REVERSING GEAR

John S. Sharpe, Haverford, Pa.

Application February 20, 1937, Serial No. 126,922

9 Claims. (Cl. 74—298)

This invention relates to variable transmission mechanisms, and a principal object of the invention is to provide a generally improved reversing drive gear suitable for use generally where a gear of this character is required, but particularly well adapted for marine purposes.

More specifically an object of the invention is to provide a reversing drive gear that shall be characterized by exceptional simplicity of assembly and compactness of form.

Another object is to provide a reversing drive gear of a form permitting straight line assembly between the driving and driven shafts, and that shall be symmetrical with respect to the common axis of said shafts.

Still another object of the invention is to provide a transmission of the stated character that shall incorporate in a unitary structure means affording, selectively, conditions of forward and reverse drive, and a neutral condition; and wherein the change to any one of said conditions from another may be made instantly under all conditions of operation with a minimum of shock and strain to and on the operating parts.

A still further object is to provide a transmission of the above character wherein the forward drive condition may be established by a direct drive connection between the driving and driven shafts, thereby eliminating idling parts; and wherein the driven shaft in reverse may be operated at the same speed of rotation as the driving shaft.

The invention further contemplates the provision of a transmission wherein the operating parts and the transmission as a whole are balanced both statically and dynamically under all conditions.

In the attached drawings:

Fig. 2 is an end elevational view of the unit, and

Fig. 3 is a plan view of the unit.

Figure 1:
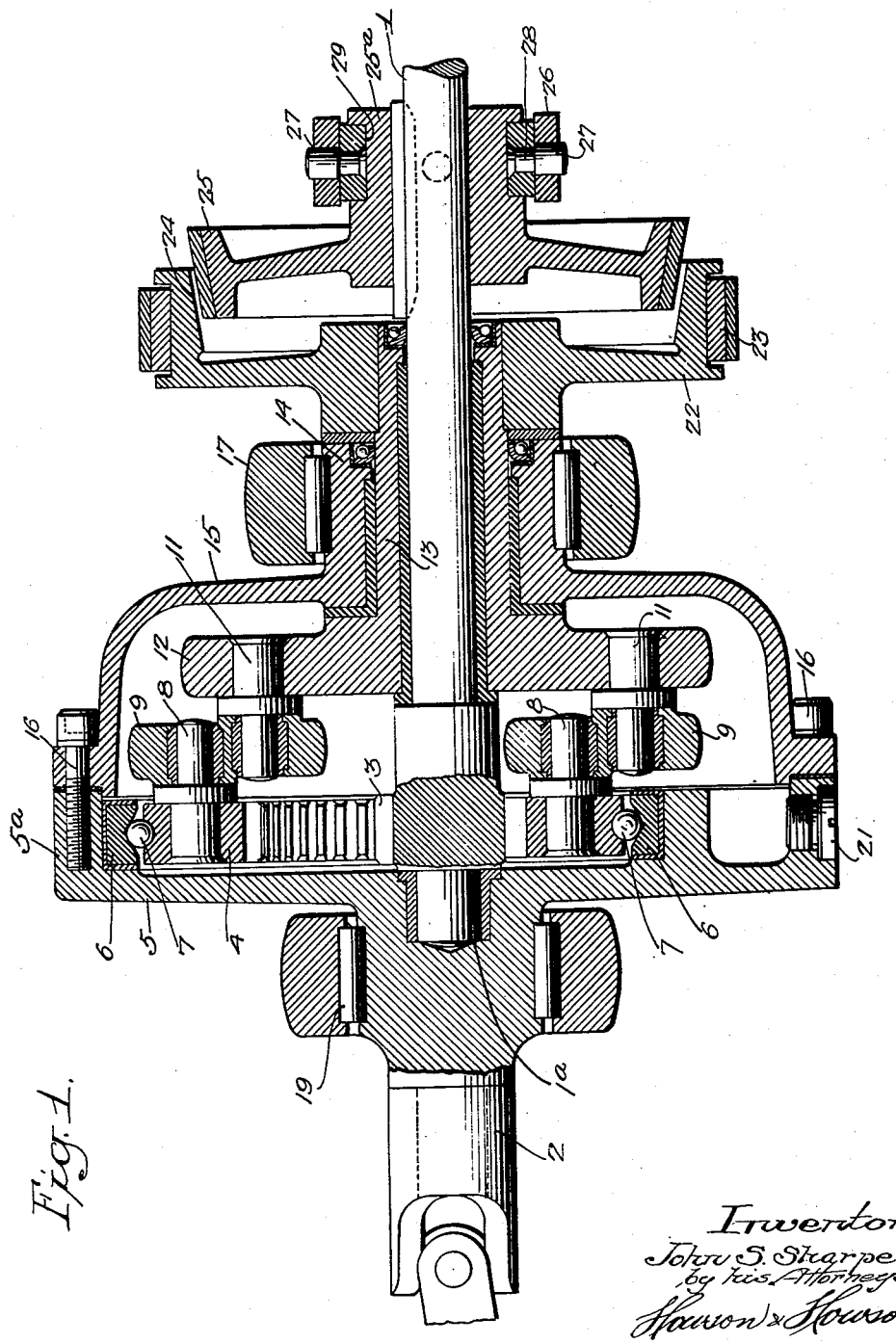
Figure 1 is a longitudinal sectional view of a reversing gear unit made in accordance with my invention.

There has long been a requirement, particularly in the marine field, for a simple, compact and relatively inexpensive reversing gear, and one preferably that would afford a driven-shaft speed in reverse equal to the speed of the drive shaft. Prior reversing gears have either been limited by practical considerations to a relatively slow reverse speed, or, in those gears wherein the reverse and forward speeds were the same, to a reduced speed in both cases as compared with the speed of the driving shaft. In some of the prior gears, for example, wherein provision for a high reverse speed was inherently possible, such provision has been found impractical by reason of the attendant requirement for heavy duty thrust bearings in order to maintain the parts, and particularly gears, in their proper relative operating positions, and aside from the item of additional expense thus introduced, even slight wear in said bearings was sufficient to materially and adversely affect the operating efficiency of the mechanism as a whole. Many of the prior gears, also, have involved the use of idling gears in either or both of the forward and reverse drives, which is undesirable for obvious reasons. The prior gears also have been such, in general, as to require axial misalignment of the driving and driven shafts, or to involve otherwise an unsymmetrical arrangement with respect to the axes of said shafts necessitating a relatively large housing space for the mechanism, this being of particular disadvantage in the smaller marine installations where available space is at a premium.

By the present invention, I provide a reversing gear which not only substantially eliminates the aforesaid disadvantages of the prior gears, but in addition affords the relatively high reverse speed required in marine usage for rapid retardation of the forward movement of the vessel.

With reference to Figure 1, the mechanism in the illustrated embodiment comprises a drive shaft 1 and a driven shaft 2 which are in axial alignment. The shaft 1 carries at its inner end a spur gear or pinion 3 which is concentric with the shaft and which meshes continuously with an internal annular gear 4. The annular gear 4 is mounted in a carrier 5 which is directly connected with and in the present instance forms an integral part of the driven shaft 2. The carrier 5 is provided with a race 6 which is eccentric to the axis of the shafts 1 and 2 and which receives a plurality of anti-friction bearing elements 7, and the annular gear 4 is provided in its outer periphery with a circumferential recess for reception of said elements 7 and forms the inner race for the latter.

Secured in the annular gear 4 and projecting transversely therefrom is a series of crank pins 8, said pins being uniformly distributed around the circumference of said gear, and each of these pins is connected by a link 9 to a pin 11 of a corresponding series projecting in the opposite direction to the pins 8 from the flange 12 of a rotary member 13, this latter member embracing and in effect forming a journal for the drive shaft 1. The rotary member 13 in turn is journaled within the terminal portion 14 of a casing member 15, the opposite end of which is secured by means of bolts 16 to the flange 5a of the carrier 5, and an anti-friction bearing 17 in the fixed frame 18 of the unit supports the member 13, a similar anti-friction bearing 19 in said frame being provided for the carrier 5 and driven shaft 2.

It will be noted that in this construction the rotary carrier 5 and the extension 15 thereof, which as previously described are directly connected to the driven shaft 2, form a closed casing for the other operating parts of the mechanism including the pinion 3, the annular gear 4 and its bearing 7, and the cranks 8—9—11, and means is provided at 21 for introducing into this closed casing a lubricant for these operating parts. It will be noted further that the drive shaft 1 in addition to the extended bearing formed in the member 13 extends beyond the pinion 3 and finds in this extended portion 1a a further bearing support in the member 5.

The outer end of the member 13 has secured thereto a brake drum 22 which is provided with a brake band 23. The drum 22 is formed at 24 so that it may also function as one element of a clutch, the other element 25 of which is splined to the drive shaft 1. Means is provided for shifting the clutch element 25 into and out of engagement with the element 24, and this shifting means comprises, as best shown in Fig. 2, a fork 26 which is connected through trunnions 27 with a strap 28 seating in a circumferential recess 29 in the hub 25a of the element 25. The fork 26 constitutes one end of a lever 31 which is pivotally mounted at 32 on the frame, and the other end 33 of this lever is connected through a link 34 with one arm 35 of a bell crank lever 36 mounted on a fixed pivot 37. The other arm 38 of this bell crank is connected through a link 39 with a manually-operated lever 41 which is pivoted at 42 to the frame, and the terminal end 43 of this lever is operatively connected, as best shown in Fig. 2, with the brake band 23. The usual notched segment 44 and pawl 45 are provided for retaining this lever 41 in adjusted position. The arrangement is such that when the lever is in the central or neutral position, as shown in Fig. 2, the clutch element 25 is disengaged from the element 24 and the brake band 23 is loose on the drum 22. When the lever is drawn to the right, as viewed in Fig. 2, from the neutral position, the clutch 24—25 is engaged while the brake band 23 remains loose on its drum. When the lever 41 is drawn to the left, as viewed in Fig. 2, from the neutral position, the clutch element 25 is disengaged from the element 24 and the brake band 23 is tightened on the drum.

The operation of the unit is as follows: It may be assumed that the shaft 1 is connected to the source of power and is being rotated from said source and that the lever 41 is in the neutral position as shown in Fig. 2, wherein the brake band 23 is loose on the drum and the clutch element 25 is retracted from the element 24. Under these conditions, the annular gear 4 is free to rotate about its own axis in its eccentric journal in the carrier 5, it being apparent that the member 13, being also free to rotate in its bearing, offers no resistance to this free rotation of the annular gear. This then constitutes the neutral position in which no power or motion is transmitted from the drive shaft 1 to the driven shaft 2. If now it be desired to operate the shaft 2 in the forward direction, the lever 41 is moved to the right from the neutral position, see Fig. 2, thereby engaging the clutch element 25 with the element 24 and operatively connecting the drive shaft 1 with the annular gear 4 through the member 13 and the cranks 9. Since the shaft 1 is also operatively connected with the annular gear 4 through the pinion 3, the gear 4 and the pinion 3 are caused to rotate as a unit, carrying with it the carrier 5 and the connected driven shaft 2. It is apparent, therefore, that all of the rotary parts of the mechanism turn together as a unit about the axis of the shafts with a direct drive relation between the drive shaft 1 and the driven shaft 2. If it be desired to reverse the direction of rotation of the driven shaft 2, the lever 31 is shifted through the neutral position to the extreme left, as viewed in Fig. 2, with the result that the clutch 24—25 is disengaged, and the brake band 23 tightened on the drum 22. This has the effect of immobilizing or anchoring the member 13, and the sole line of transmission is then through the pinion 3 to the annular gear 4. The cranks 9, however, prevent the annular gear 4 from rotating in its carrier about its own axis, and permits movement of the annular gear only in an orbital path and without rotation. This movement of the gear 4 in its orbital path, however, is in a direction reverse to the rotative direction of the pinion 3, with the result that the carrier 5 and the driven shaft 2 are also rotated in this reverse direction. If now the pitch diameter of the pinion 3 is one-half of the pitch diameter of the annular gear 4, the member 5 and shaft 2 will be caused to rotate in the opposite direction from the drive shaft 1 and at the same rate of speed.

It will be noted that the mechanism as described comprises only the two toothed gears 3 and 4, and that these gears remain continuously in mesh under all operating conditions, inclusive of the forward and reverse drives and the neutral or non-torque transmitting position, as well as during the changes from one condition of operation to another. It will be noted further that in an extremely compact and simple transmission unit, the device provides for a forward direct drive connection between the driving and driven terminal elements of the unit, a neutral drive condition, and a reverse drive in which the driven member rotates at the same speed as the driving member. It is to be noted, however, that the speed of reverse rotation may be varied within limits by employing a spur gear in place of the pinion 3 which shall be either greater or smaller than one-half the diameter of the annular gear 4. When the pinion 3 is smaller, the speed of rotation of the driven shaft in reverse is relatively slow as compared with the speed of rotation of the drive shaft, and when the pinion 3 is greater in diameter than one-half the diameter of the annular gear, the speed of rotation of the driven shaft is increased over the speed of rotation of the drive shaft 1. Attention is also directed to the fact that by reason of the location in a true radial plane of the bearings 7, the annular gear 4 and the spur gear 3, there is a complete absence of force couples tending to misalign the parts, and all unbalanced force of this character is relieved from the cranks 9, the latter thereby bearing no part of the load and having the sole function either of immobilizing the annular gear 4 with respect to the member 13 or of preventing rotation of the annular gear 4 about its own axis in the reverse drive condition of adjustment. Still further, attention is directed to the fact that in the assembly disclosed, the various interrelated parts are so weighted as to counterbalance each other under all conditions of operation. It is to be noted, for example, that the weight of the member 5 is so distributed as to directly counterbalance the otherwise unbalanced weight of the eccentrically located annular gear 4, and that this relative weight distribution is maintained at all times.

It is believed that the superior characteristics of the aforedescribed mechanism as a reversing gear will be apparent from the foregoing description. Among the contributing factors may be mentioned the complete absence of idling parts in forward drive; the compactness of form and the symmetrical nature of the unit with respect to the common axis of the driving and driven shafts; the simplicity of the mechanism which comprises only two gears, and the absence of any requirement for thrust bearings to maintain these two gears in normal operative relation; the one to one drive relation between the shafts both in forward and reverse drives; and the absence of excessive shock and strain on any of the working parts when the direction of operation is changed, it being noted that except for the driven shaft the reversal is effected by a change in the character of movement of the operating parts instead of by a mere change in direction of rotation of said parts.

It will be apparent that there may be some modification in the forms of the individual elements and in their relative positions in the assembly without departure from the invention.

I claim:

1. In a reversing gear unit, the combination with coaxial rotary driving and driven members constituting the input and output terminal elements of said unit respectively, of a pinion fixed concentrically to one of said members, an annular gear meshing internally with said pinion and journaled on and eccentrically to the other of said members, means for immobilizing said annular gear with respect to the pinion whereby said gear and pinion may be caused to rotate as a unit, means for preventing movement of said annular gear with respect to its own axis while permitting movement of said gear in an orbital path determined by the eccentricity of said journal whereby said pinion may be caused to move the gear in said path but in a direction opposite to the direction in which said pinion is rotated, means for selectively actuating said immobilizing and rotation-preventing means whereby said driven member may be caused to rotate in either direction as required, and means for simultaneously rendering said actuating means inoperative.

2. A reversing gear unit comprising in combination an annular gear and means for supporting said gear for movement without rotation in an orbital path, of a pinion coaxial with said orbital path and having driving connection with the interior of said gear, said supporting means comprising a rotary member coaxial with said pinion and means for operatively connecting said member to the gear, releasable means for preventing rotation of said rotary member, means for releasably immobilizing said member with respect to the pinion for joint rotation, and means for selectively actuating said rotation-preventing and immobilizing means and for rendering said means simultaneously inoperative, and a rotary member coaxial with said pinion and comprising an eccentric journal for said annular gear concentric with the latter, and rotary elements coaxial with and directly connected respectively with the last-named rotary member and said pinion and constituting selectively the terminal driving and driven elements of said unit.

3. In a reversing gear unit, the combination with co-axial rotary driving and driven members, of a pinion fixed concentrically to one of said members, an annular gear meshing internally with said pinion, a member carried by the other of said members and comprising an annular wall embracing the periphery of said gear and forming a journal for the latter, means for immobilizing said annular gear with respect to the pinion whereby said gear and pinion may be caused to rotate as a unit, means for preventing movement of said annular gear with respect to its own axis while permitting movement of said gear in an orbital path determined by the eccentricity of said journal whereby said pinion may be caused to move the gear in said path but in a direction opposite to the direction in which said pinion is rotated, means for selectively actuating said immobilizing and rotation-preventing means whereby said driven member may be caused to rotate in either direction as required, and means for simultaneously rendering said actuating means inoperative.

4. In a reversing gear unit, the combination with co-axial rotary driving and driven members, of a pinion fixed concentrically to one of said members, an annular gear meshing internally with said pinion, a member carried by the other of said members and comprising an annular wall embracing and radially removed from the periphery of said gear and providing a journal support for the latter, anti-friction bearing means confined between said wall and the gear, means for immobilizing said annular gear with respect to the pinion whereby said gear and pinion may be caused to rotate as a unit, means for preventing movement of said annular gear with respect to its own axis while permitting movement of said gear in an orbital path determined by the eccentricity of said journal whereby said pinion may be caused to move the gear in said path but in a direction opposite to the direction in which said pinion is rotated, means for selectively actuating said immobilizing and rotation-preventing means whereby said driven member may be caused to rotate in either direction as required, and means for simultaneously rendering said actuating means inoperative.

5. In a reversing gear unit, the combination with co-axial rotary driving and driven members, of a pinion fixed concentrically to one of said members, an annular gear meshing internally with said pinion, a member carried by the other of said members and comprising an annular wall embracing the periphery of said gear and forming a journal for the latter, a rotary member coaxial with said pinion and a series of cranks operatively connecting said member to the gear and permitting movement of said gear in an orbital path with respect to said member, releasable means for preventing rotation of said rotary member, means for releasably immobilizing said member with respect to the pinion for joint rotation, and means for selectively actuating said rotation-preventing and immobilizing means and for rendering said means simultaneously inoperative.

6. In a reversing gear unit, the combination with co-axial driving and driven shafts constituting the input and output terminal elements of said unit respectively, of a casing carried by one of said shafts and embracing the adjoining end of the other of said shafts, an annular internal gear journaled in said casing eccentrically with respect to the common axis of said shafts, a pinion on the last-named of said shafts meshing with said annular gear, an independent rotary member co-axial with said shafts, and means in the interior of said casing for operatively connecting said rotary member with the annular gear, said operative connection permitting an orbital movement of said annular gear with said casing but without movement of said gear with respect to its own axis when said rotary member is immobilized and leaving said gear free to rotate about its own axis in said journal when said rotary member is released for rotation, means for immobilizing said rotary member, means for operatively connecting said member with one of said shafts for joint rotation with the latter, said immobilizing and connecting means being selectively operative, and means for rendering said immobilizing and connecting means simultaneously inoperative.

7. In a reversing gear unit, the combination with a co-axial driving and driven shafts constituting the input and output terminal elements of said unit respectively, of a casing carried by one of said shafts and embracing the adjoining end of the other shaft, an annular internal gear journaled in said casing eccentrically with respect to the common axis of said shafts, a pinion on the last-named shaft meshing with said annular gear, an independent rotary member coaxial with said shafts, and means in the interior of said casing for operatively connecting said rotary member with the annular gear, said operative connection permitting an orbital movement of said annular gear with said casing but without movement of said gear with respect to its own axis when said rotary member is immobilized and leaving said gear free to rotate about its own axis in said journal when said rotary member is released for rotation, a brake operatively connected with said rotary member for immobilizing the latter, a clutch for operatively connecting said rotary member with the pinion shaft, and a common actuator for said brake and clutch, said actuator permitting simultaneous release and selective operation of said brake and clutch.

8. In a transmission gear, the combination with two axially aligned shafts, of a pinion fixed concentrically on one of said shafts, an annular gear meshing interiorly with said pinion, means providing a journal for said gear on the other of said shafts for rotation of the gear, about its own axis, said journal being eccentric to the axis of said shafts, a rotary member coaxial with said shafts, and means for operatively connecting said member with the annular gear, said connecting means permitting translational movement of the gear with respect to said member in the said orbital path without movement of the gear with respect to its own axis, and said pinion having a pitch diameter equal to one-half the pitch diameter of said annular gear whereby rotation of one of said shafts in a given direction coincidently with immobilization of said rotary member will cause a rotation of the other shaft at the same sped but in the opposite direction.

9. In a reversing gear, the combination with a pair of axially aligned shafts, of means for interlocking said shafts for simultaneous rotation in the same direction, and mechanism linking said shafts and operative when one of said shafts is rotated in one direction to drive the other shaft in the opposite direction, said mechanism comprising a plurality of elements inclusive of an annular gear, a spur gear meshing with said annular gear, said gears being carried respectively by said shafts, and one of said gears being journaled on its carrier shaft for rotation about an axis eccentric to the axis of said shaft, a rotary member coaxial with the shafts, a crank on the last named gear, a second crank on said rotary member, a link connecting said cranks, and means for immobilizing one of said elements to thereby effect a reactionary movement of the other of said elements under actuation by the one shaft to drive the other shaft in the reverse direction as aforesaid.

JOHN S. SHARPE.